(12) United States Patent
Griffin et al.

(10) Patent No.: US 11,409,543 B2
(45) Date of Patent: Aug. 9, 2022

(54) METHOD AND APPARATUS FOR IMPROVING DATA MANAGEMENT IN AN INFORMATION HANDLING SYSTEM

(71) Applicant: DELL PRODUCTS, LP, Round Rock, TX (US)

(72) Inventors: Christopher Griffin, Cedar Park, TX (US); Maheshwar Dattatri, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 367 days.

(21) Appl. No.: 16/780,558

(22) Filed: Feb. 3, 2020

(65) Prior Publication Data

US 2021/0240492 A1    Aug. 5, 2021

(51) Int. Cl.
| | |
|---|---|
| G06F 9/44 | (2018.01) |
| G06F 9/4401 | (2018.01) |
| G06F 9/445 | (2018.01) |
| G06F 9/54 | (2006.01) |
| G06F 11/32 | (2006.01) |
| G06F 11/30 | (2006.01) |
| G06F 8/60 | (2018.01) |

(52) U.S. Cl.
CPC ............ *G06F 9/4416* (2013.01); *G06F 8/60* (2013.01); *G06F 9/4406* (2013.01); *G06F 9/44505* (2013.01); *G06F 9/542* (2013.01); *G06F 11/302* (2013.01); *G06F 11/3006* (2013.01); *G06F 11/3075* (2013.01); *G06F 11/321* (2013.01)

(58) Field of Classification Search
CPC .................................... G06F 9/44; G06F 1/32
See application file for complete search history.

(56) References Cited

U.S. PATENT DOCUMENTS

| | | | |
|---|---|---|---|
| 9,210,714 B2 | 12/2015 | Egner et al. | |
| 9,544,907 B2 | 1/2017 | Egner et al. | |
| 9,736,258 B2 | 8/2017 | Holland | |
| 9,780,823 B2 | 10/2017 | Egner et al. | |
| 9,949,280 B2 | 4/2018 | Egner et al. | |
| 10,146,628 B2 | 12/2018 | Hammons et al. | |
| 2010/0306356 A1* | 12/2010 | Gao | G06F 8/60 |
| | | | 709/222 |
| 2013/0138956 A1* | 5/2013 | Swist | H04N 21/4184 |
| | | | 713/168 |
| 2017/0353603 A1* | 12/2017 | Grunewald | G06Q 30/0631 |
| 2019/0182323 A1* | 6/2019 | Srinivasan | G06F 9/5088 |

\* cited by examiner

*Primary Examiner* — Keshab R Pandey
(74) *Attorney, Agent, or Firm* — Larson Newman, LLP

(57) ABSTRACT

An information handling system includes a delay controller having an analytics engine configured to analyze telemetry data associated with an installation of a program, to calculate a confidence index based upon the analyzed telemetry data, and to generate a recommendation corresponding to the calculated confidence index. A download controller receives an end-user recommendation selection, and delays the installation of the program based upon a delay time in the received end-user recommendation selection.

20 Claims, 5 Drawing Sheets

400

| | Timing 430 | Confidence Indices 440 | Recommendations 450 |
|---|---|---|---|
| Reinstallation Of An Operating System 410 | No Delay 431 | 0.9 441 | First Priority 451 |
| | One Hour Delay 432 | 0.1 442 | Anomalous Event Warning 452 |
| | Two Hours Delay 433 | 0.6 443 | Second Priority 453 |
| Software Patching 420 | No Delay 434 | 0.9 444 | First Priority 454 |
| | Two Hours Delay 435 | 0.2 445 | Reconfigure System 455 |
| | Ten Hours Delay 436 | 0.1 446 | Do Not Perform 456 |

*FIG. 4*

METHOD AND APPARATUS FOR IMPROVING DATA MANAGEMENT IN AN INFORMATION HANDLING SYSTEM

FIELD OF THE DISCLOSURE

This disclosure generally relates to information handling systems, and more particularly relates to improving data management in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a delay controller having an analytics engine configured to analyze telemetry data associated with an installation of a program, to calculate a confidence index based upon the analyzed telemetry data, and to generate a recommendation corresponding to the calculated confidence index. A download controller may delay the installation of the program based upon a delay time in the received end-user recommendation selection.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 4 is a table of calculated confidence indices and corresponding recommendations to improve customer experience according to an embodiment of the present disclosure.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
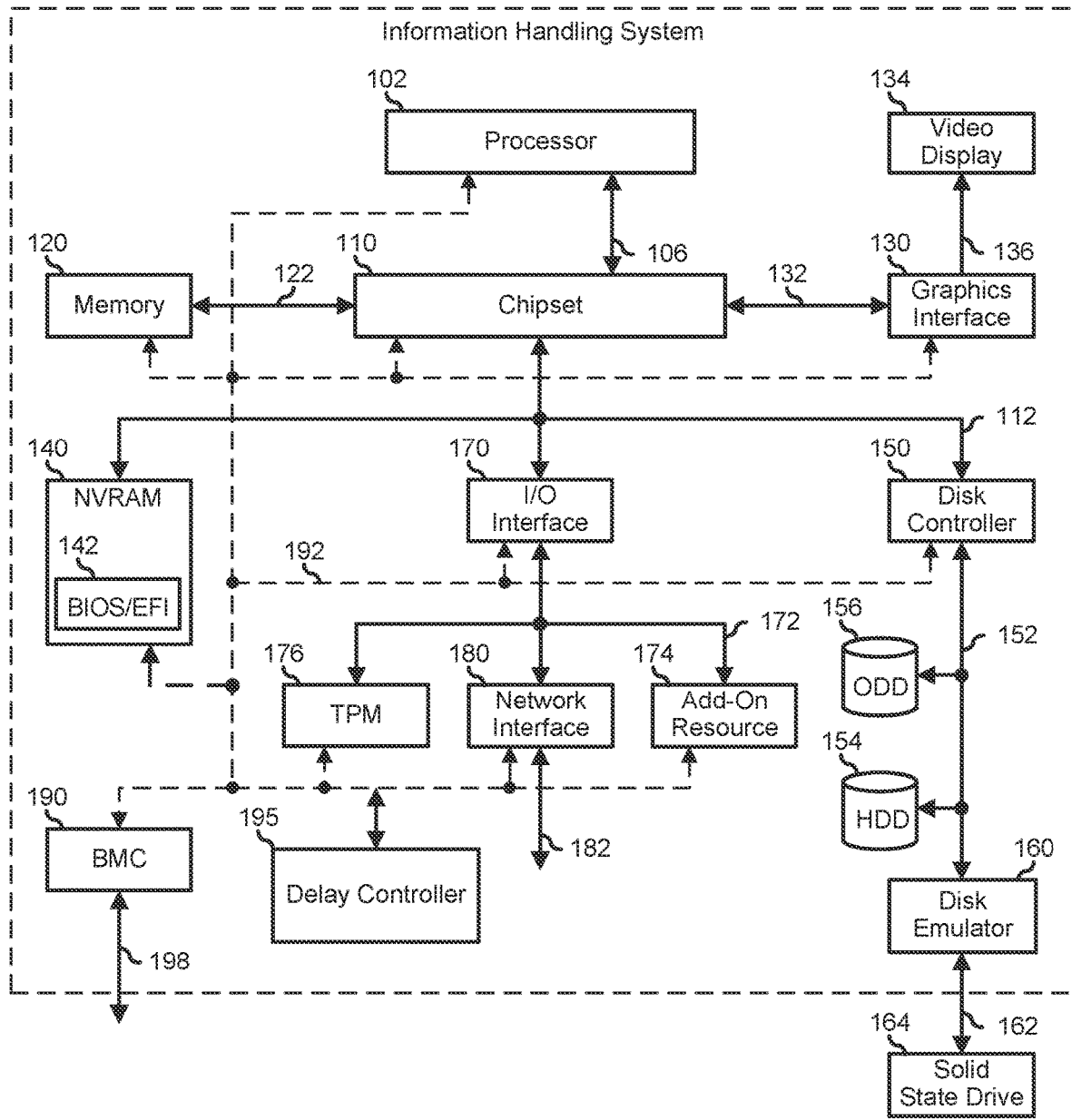
FIG. 1 is a block diagram illustrating an information handling system according to an embodiment of the present disclosure.

FIG. 1 illustrates an embodiment of an information handling system 100 including a processor 102, processor interface 106, chipset 110, memory 120, graphics adapter 130 connected to video display 134, non-volatile RAM (NV-RAM) 140 that includes a basic input output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, a baseboard management controller (BMC) 190, and a delay controller 195. The information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. The elements depicted in information handling system 100 may not be representative of all elements of information handling systems in general. Moreover some elements as depicted in information handling system 100 may not be applicable to all information handling systems as described in the present embodiments.

Chipset 110 represents an integrated circuit or group of integrated circuits that manages data flow between the processor 102 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a NIC, a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from the processor 102, which provides various management functions for information handling system 100. In an embodiment, BMC 190 grants access to an external device. The BMC 190 may communicate with the external device using a network interface 198.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes the network interface 198 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

Delay controller 195 includes hardware circuitry that is configured to manage installation of a program or performance of a process in the information handling system. The installation of the program includes, for example, a reinstallation of an operating system that may require data downloading from a remote server. Similarly, the performance of the process may include reconfiguration of hardware elements of the information handling system along with the need to download data from the remote server. In various embodiments, timing for the installation of the program or the timing for the performance of the process is based on a specific customer scenario. In these embodiments, the delay controller 195 can provide the timing that includes plan of action selections to improve customer experience.

Figure 2:
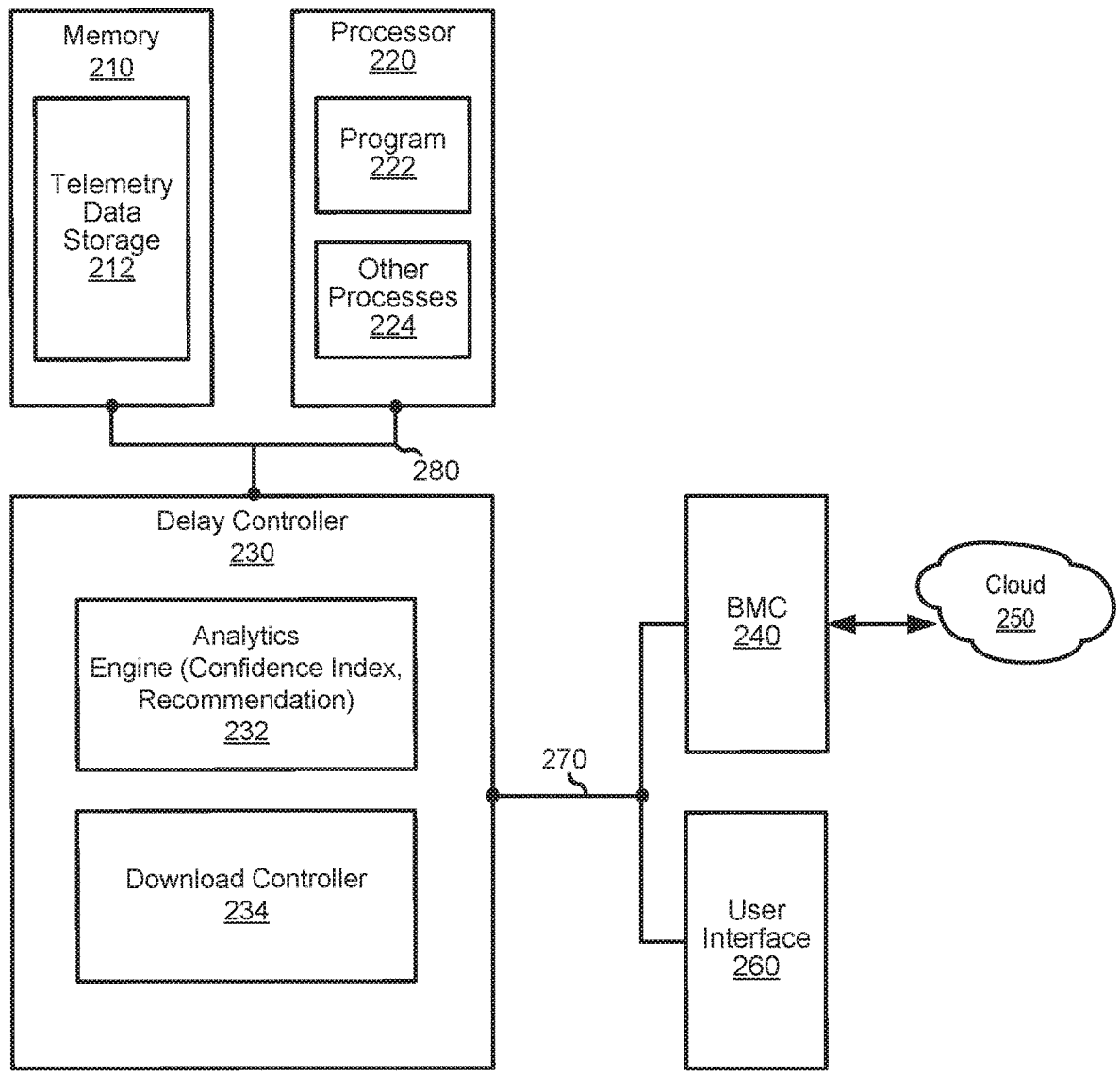
FIG. 2 is a block diagram illustrating a portion of the information handling system according to an embodiment of the present disclosure.

FIG. 2 shows an information handling system 200 that includes a memory 210 including a telemetry data storage 212, processor 220 that is configured to initiate installation of a program 222 or to perform one or more processes 224, and a delay controller 230 that includes an analytics engine 232 and a download controller 234. The information handling system 200 further includes a BMC 240 that is connected to a cloud 250, a user interface 260, and a first interface 270 that connects the BMC and the user interface to the delay controller 230. A second interface 280 connects the memory 210 and the processor 220 to the delay controller 230. The elements and components of the information handling system 200 are similar to the elements and components of the information handling system 100.

As an operation overview of the information handling system 200, the processor 220 may initiate the installation the program 222 or the performance of the process 224. The installation or the performance of the process may require data downloading, system restart after the installation of the downloaded data, a partial system shutdown, a reconfiguration of the information handling system, or a combination thereof. In this regard, the delay controller 230 analyzes telemetry data that may be associated with the installation of the program 222 or the performance of the process 224. With the analyzed telemetry data, the delay controller 230 may calculate a confidence index that may include information about "how fast" and "how likely" will the installation of the program 222 be completed or the process 224 is performed over a particular period of time. The confidence index can be based upon data downloading speed, real-time events that may delay the data downloading speed, and the like. Based upon the calculated confidence index, the delay controller 230 presents a corresponding recommendation to the end-user. The recommendation may include options such as delaying the installation of the program, scheduling the performance of the process, cancelling the performance of the process due to predicted catastrophic event, changing the process to be performed, and the like. In this manner, the installation of the program 222 or the performance of the current process 224 can be performed at a higher efficiency to improve data management. In various embodiments, the telemetry data may be derived from detected parameters within the information handling system, measurements from a remote site such as from the cloud 250, and the like.

The telemetry data storage 212 may store telemetry data that are received from the cloud 250, content delivery network providers, and/or other network servers. The telemetry data include measured metrics that are associated with the installation of the program 222 or the performance of the process 224. For example, the measured metrics can include data transmission rates by a nearest network server that supports the information handling system 200, available bandwidth of the nearest network server that supports the installation of the program 222, real-time anomalous events such as critical traffic in the nearest network server that can stop the installation of the program, a projected configuration change by a supporting network switch that may affect the installation of the program, critical temperature of the supporting network switch that can affect the process to be performed, and the like. In this example, the measured real-time metrics are stored in the telemetry data storage 212.

The telemetry data storage 212 also stores measured events within the information handling system. For example, the measured events include current clock speed, amount of cache memory, number of processors currently running, total workload, data bus width, and other events or parameters that may delay or affect the installation of the program 222 and/or the performance of the process 224. In an embodiment, the telemetry data storage 212 receives telemetry data request from the analytics engine 232 and the telemetry data storage transmits the stored telemetry data to the analytics engine. In this embodiment, the analytics engine 232 is configured to perform an algorithm that analyzes the effect of each measured metric to the installation of the program or the performance of the process. For example, the confidence index initially includes a value of 1.0. In this example, each measured metric can have a corresponding value that will be deducted from the initial value of the confidence index. Furthermore, the corresponding value of the measured metric may include different predicted amounts for different delay times for the installation of the program or the performance of the process.

The confidence index includes a predicted optimization value indicating duration and speed of the program installation or the performing of the process at a particular time period. Different confidence indices may be calculated over a different period of time due to changing events that may be monitored and stored in the telemetry data storage 212. For example and in the case of installing the program 222, the confidence index can include a predicted time duration of ten minutes to complete the installation of the program when there is no delay in the installation. In another example, the confidence index includes predicted time duration of two minutes to complete the installation of the program when the installation is delayed by an hour. In these examples, the confidence index may be based from the continuously monitored real-time events, historical data stored in the telemetry data storage 212, and/or future events that are predicted to happen. The historical data includes previously monitored events within the information handling system, previously received telemetry data from the cloud 250, and the like.

The delay controller 230 represents an element of the information handling system 200 that operates to control the analytics engine 232 and the download controller 234. The delay controller 230 may monitor the initiation of the installation of the program 222 or the performance of the process 224. In a particular embodiment, the delay controller 230 may be configured like the BMC and operates out-of-band with the processor 220. That is, the operation of delay controller 230 is provided based upon hardware circuit that is independent of the processor 220, or based upon the execution by a separate processor or controller of code that operates independently of the processor. In another embodiment, the delay controller 230 operates in-band with the processor 220. That is, the operation of delay controller 230 is provided based upon the execution by processor 220 of code that implements the functions and feature of the delay controller. In yet another embodiment, the functions and features of delay controller 230 may be provided by a combination of in-band and out-of-band elements, as needed or desired.

In an embodiment, the analytics engine 232 includes hardware circuitry that analyzes the telemetry data from the telemetry data storage 212. The analytics engine 232 can monitor and analyze measured real-time events within the information handling system 200. For example, internal sensors such as processor speed detector, power measurements, thermostat, and the like, may measure real-time internal events that can affect the installation of the program 222 or the performance of the process 224. Similarly, the analytics engine 232 may receive measured metrics from the cloud 250 where hundreds and thousands of metrics can be measured based from geography of the information handling system 200, host server address, local time zone, system configuration, internet service provider details, and the like. In this example, the analytics engine 232 may perform the algorithm that integrates the stored telemetry data with the measured real-time events to calculate the confidence indices over different amount of delay periods. The different amount of delay periods include a range of zero delay to a particular amount of delay time such as two hours, ten hours, twenty four hours, etc.

With the calculated confidence index, the analytics engine 232 may generate recommendation corresponding to each one of the calculated confidence indices. Different calculated confidence indices may correspond to different recommendations. For example, the recommendation suggest to the end-user a first priority that corresponds to highest calculated confidence index. In another example, the recommendation includes duration time and a warning of possible catastrophic event when a particular delay period is selected. In another example still, the recommendation includes suggested changes in the hardware configuration, suggested automation of the installation of the program, and so on. In these examples, the recommendations are based upon the measured real-time events and the telemetry data that are associated with the program to be installed or the process to be performed.

Download controller 234 includes hardware circuitry that implements the end-user selected recommendation. In an embodiment and based upon the received end-user selected recommendation, the download controller 234 is configured to facilitate downloading of data that are associated with the program to be installed or associated with the process to be performed. The download controller 234 may further initiate a system restart, a change in the current hardware configuration, and the like, that is included in the end-user selected recommendation. In this embodiment, the download controller 234 is configured to implement the timing for the data downloading, system restart, and other functions that are included in the end-user selected recommendation.

The BMC 240 may be connected with the cloud, a network access, a network switch, and the like, where the BMC receives the telemetry data that can be used by the analytics engine 232. For example, the BMC 240 receives the telemetry data from a particular content delivery network provider. In another example, the BMC 240 receives the measured real-time events from the cloud or remote sensors. In these examples, the BMC 240 can facilitate the updating of the stored real-time events, telemetry data, etc. in the telemetry data storage 212. User interface 280 may include an input box for the end-user to enter a particular recommendation selection. The user interface 280 may further alert the end-user of the measured or predicted catastrophic events that may totally stop the installation of the program or the performance of the process.

Figure 3:
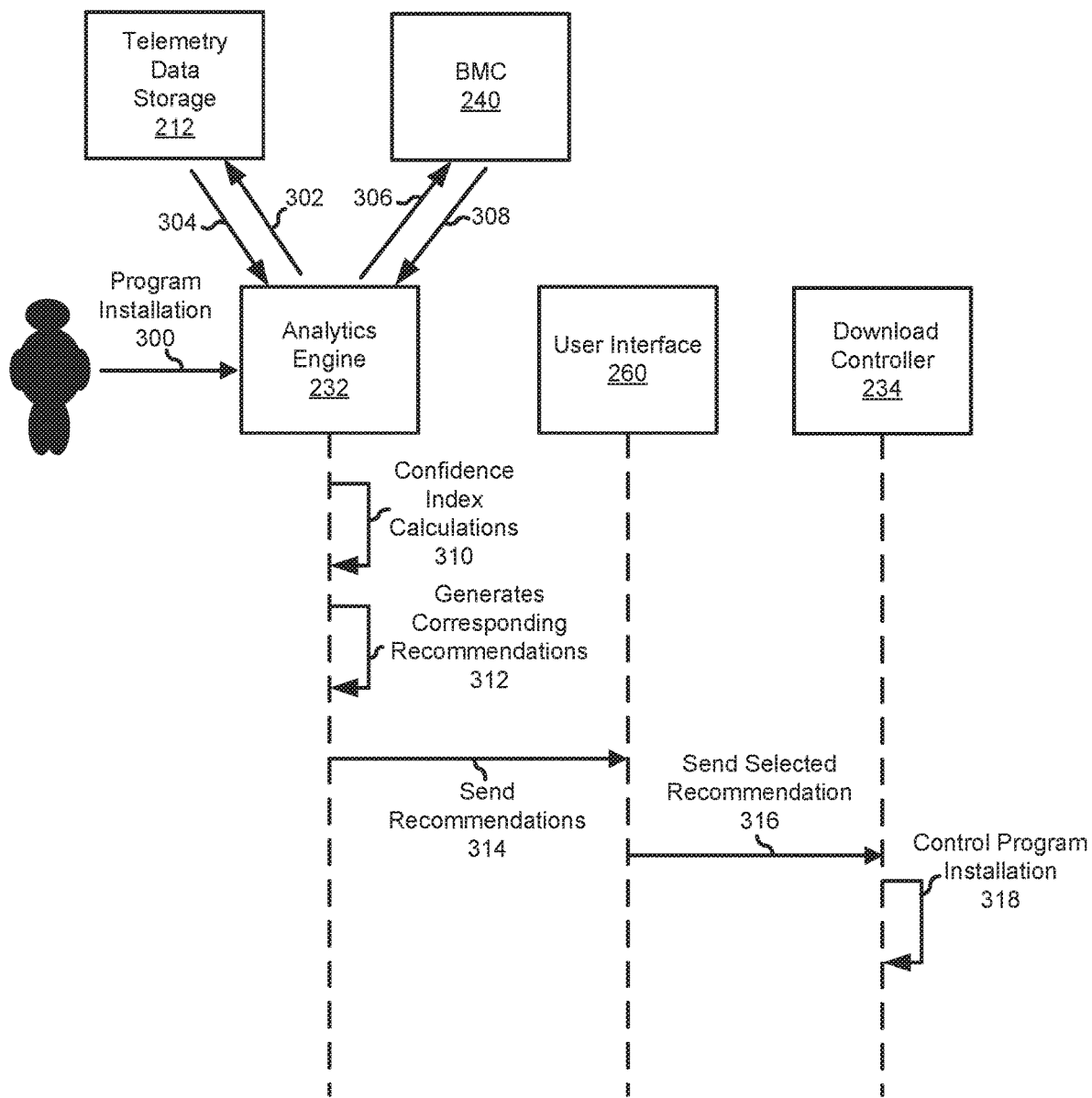
FIG. 3 is a sequence diagram of a method for an installation of a program according to an embodiment of the present disclosure.

FIG. 3 shows a diagram for the installation of the program in the information handling system. The installation of the program can be initiated by the processor 102. In other cases, the end-user can initiate the installation of the program. For example, the end-user initiates program installation 300 by attaching a USB key that activates reinstallation of the operating system. In this example, the analytics engine 232 detects the initiation of the operating system reinstallation and sends data request 302 to the telemetry data storage 212. The telemetry data storage 212 sends 304 the stored telemetry data, historical data, real-time measurements from the internal sensors, and other events or parameters that are associated with the reinstallation of the operating system. The analytics engine 232 may further send telemetry data request 306 through the BMC 240 and the BMC can forward 308 the monitored metrics and measured real-time events that may be received from the cloud, network provider, and the like.

With the telemetry data and measured real-time events, the analytics engine 232 performs confidence index calculations 310 for different amount of delay times. For example, the first calculated confidence index corresponds to zero delay time period that requires immediate reinstallation of the operating system. The second calculated confidence index corresponds to a particular delay time of one hour, and so on. In this example, the analytics engine 232 generates corresponding recommendations 312 for each one of the calculated confidence indices. In an embodiment, the analytics engine 232 send recommendations 314 to the user interface 260. The end-user may select one of the recommendations and the user interface 260 sends selected recommendation 316 to the download controller 234. In this embodiment, the download controller 234 is configured to control the program installation 318 according to the parameters of the selected recommendation. For example, the selected recommendation includes reinstallation of the operating system at midnight where low traffic is available. In another example, the selected recommendation requires reconfiguration of the information handling system along with the reinstallation of the operating system at midnight hour. In this case, the download controller 234 implements the features and parameters that were included in the selected recommendation.

The described diagram is not limited to the installation of the program such as the reinstallation of the operating system. In various embodiments, a shutdown operation is initiated by the end-user and the analytics engine 232 may detect the initiated shutdown operation that may require data downloading. In this case, the analytics engine 232 analyzes the telemetry data and other events that are associated with the shutdown operation and generates the corresponding recommendations 312 for the end-user. In another embodiment, the end-user initiates the transmission of large data from the information handling system to a remote storage. Similarly, the analytics engine 232 analyzes configuration of the information handling system, the real-time events, and other telemetry data that are associated with data transmission, and sends the recommendations to the end-user. In yet other embodiments such as solution deployment, software patching, system startup that requires a combination of hardware information and software downloading, etc., the analytics engine 232 analyzes the telemetry data and other events that are correspondingly associated with the solution deployment, software patching, and the like, and sends the corresponding recommendations to the end-user. In these embodiments, the confidence metrics and corresponding recommendations are communicated to the end-user to improve customer experience.

FIG. 4 shows a table 400 that includes the calculated confidence indices and the corresponding recommendations for improved data downloading experience. The table 400 includes a reinstallation of an operating system 410 and a software patching 420 which are example applications of program installation and performance of a process, respectively. The table 400 further includes a timing 430, confidence indices 440, and corresponding recommendations 450. In an embodiment and for the reinstallation of the operating system 410, the timing 430 may include no delay 431, one hour delay 432, two hours delay 433, and so on. For each one of the timing 430, the analytics engine 232 may calculate the corresponding confidence indices 440 and generate the corresponding recommendations 450. For example, the reinstallation of the operating system 410 has a calculated confidence index 441 of 0.9 when there is no delay 431 in the reinstallation of the operating system. In another example, the reinstallation of the operating system 410 has a calculated confidence index 442 of 0.1 when there is one hour delay 432, and so on. In these examples, the end-user may select the corresponding recommendation to improve customer experience. For example, the user interface 260 alerts the end-user of the anomalous event warning 252 when the timing 430 includes two hours delay 433. In this example, the advance notice may require the end-user to perform system reconfiguration, selection of other recommendations, or other action plan as may be needed or desired.

In various embodiments, the confidence index 440 for the reinstallation of the operating system 410 or the software patching 420 can be derived based from host machine real-time status, software server host status, network server status, geography information coupled with insights from historical telemetry data, and the like. In these embodiments, the confidence index 440 can be continuously updated in case of varying telemetry data or measured events. The updated confidence indices may include corresponding updated recommendations 450.

Figure 5:
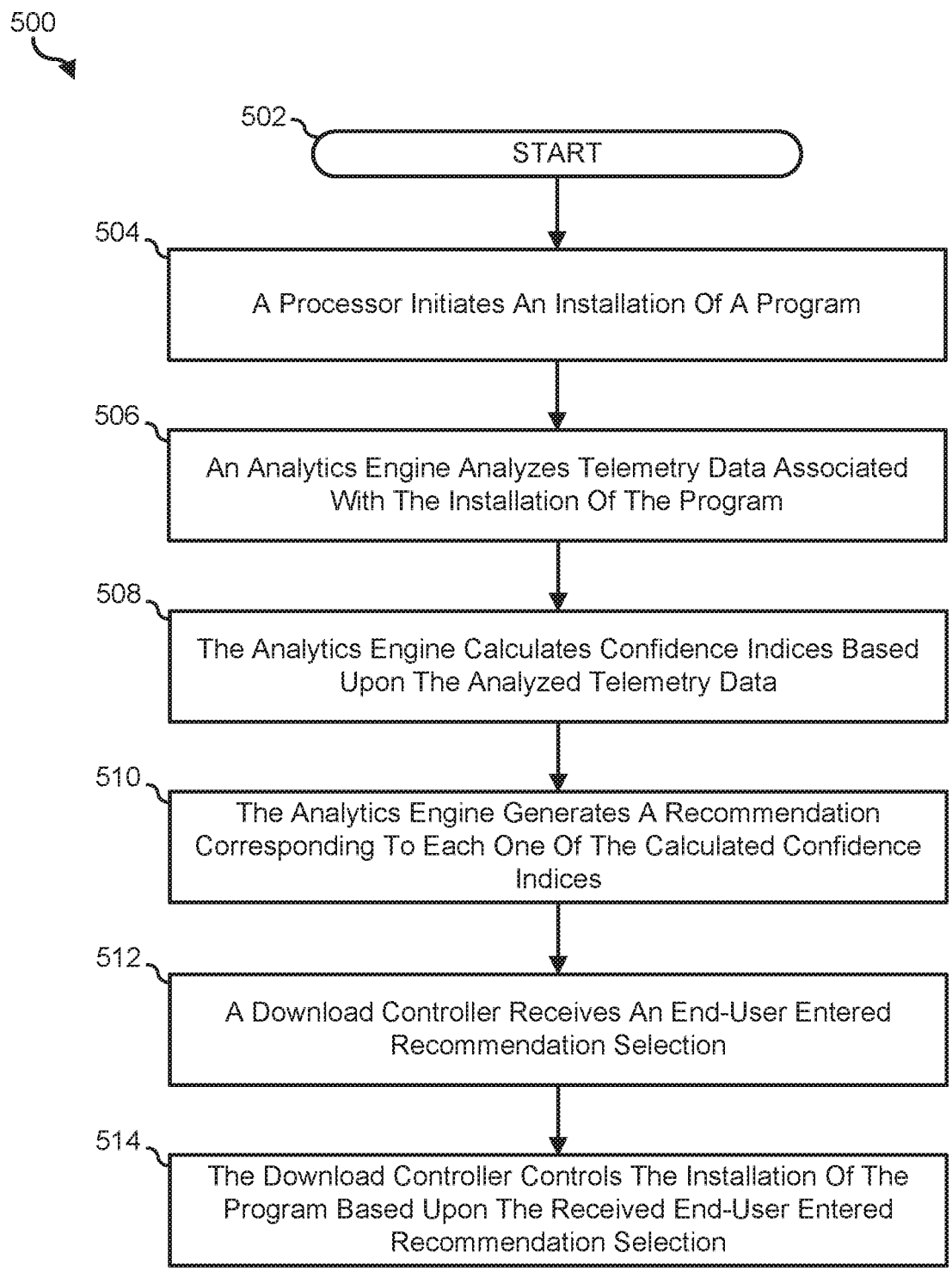
FIG. 5 is a flow chart showing a method of improving data management in the information handling system according to an embodiment of the present disclosure.

FIG. 5 shows a method 500 for confident data management in the information handling system, starting at block 502. At block 504, the processor initiates an installation of a program. For example, the processor 102 initiates reinstallation of the operating system. At block 504, the analytics engine analyzes the telemetry data and events that are associated with the installation of the program. For the example reinstallation of the operating system, the analytics engine 232 is configured to analyze the stored telemetry data, measured real-time events, and configurations of the information handling system that may affect the reinstallation of the operating system. At block 508, the analytics engine calculates the confidence indices based upon the analyzed telemetry data. With the calculated confidence indices, and at block 510, the analytics engine generates corresponding recommendations based upon each one of the calculated confidence indices. At block 512, the download controller receives an end-user entered recommendation selection. At block 514, the download controller controls the installation of the program based from the parameters that are found in the received end-user recommendation selection. In an embodiment, the controlling of the installation of the program includes delaying the installation of the program, reconfiguring present elements of the information handling system, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various I/O devices, such as a keyboard, a mouse, and a video display. Information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system having improved data management, comprising:
   a processor; and
   a delay controller coupled to the processor, the delay controller including:
      an analytics engine configured to analyze telemetry data associated with an installation of a program, to calculate a confidence index based upon the analyzed telemetry data, and to generate a recommendation corresponding to the calculated confidence index; and
      a download controller configured to receive an end-user recommendation selection, and to delay the installation of the program based upon a delay time in the received end-user recommendation selection.

2. The information handling system of claim 1, wherein the installation of the program includes reinstallation of an operating system.

3. The information handling system of claim 2, wherein the telemetry data include measured real-time events that that are monitored from a remote site.

4. The information handling system of claim 1, wherein the telemetry data include measurements based upon local time zone, geography, and system configuration of the information handling system.

5. The information handling system of claim 1, wherein different recommendations are generated for different confidence indices, wherein each one of the recommendations includes a particular amount of the delay time for the installation of the program.

6. The information handling system of claim 1, wherein the recommendation includes automated installation of the program at a particular period of time.

7. The information handling system of claim 1, wherein the analytics engine receives measured real-time events through a baseband management controller.

8. The information handling system of claim 1, wherein the confidence index includes a metric indicating duration and speed of the installation of the program.

9. The information handling system of claim 1 further comprising a telemetry data storage that stores the telemetry data, historical data, and real-time measured events that are received through a baseband management controller.

10. The information handling system of claim 1, wherein the delaying the installation of the program includes changing a configuration of the information handling system.

11. An information handling system, comprising:
a processor; and
a delay controller coupled to the processor, the delay controller including:
an analytics engine configured to analyze telemetry data associated with data downloading, to calculate a confidence index based upon the analyzed telemetry data, and to generate a recommendation based upon the calculated confidence index; and
a download controller configured to receive an end-user recommendation selection and to control the data downloading based upon the received end-user recommendation selection.

12. The information handling system of claim 11, wherein the data downloading is used to install a program or to perform a process in the information handling system.

13. The information handling system of claim 11, wherein the telemetry data are measured based upon local time zone and geography of the information handling system, system configuration of the information handling system, or a combination thereof.

14. The information handling system of claim 11, wherein the generated recommendation includes a delay time for the data downloading.

15. The information handling system of claim 14, wherein the generated recommendation includes system reconfiguration of the information handling system.

16. The information handling system of claim 11, wherein the analytics engine receives the telemetry data through a baseband management controller.

17. The information handling system of claim 16, wherein the confidence index includes a metric indicating duration time for completion of the data downloading.

18. A method, comprising:
initiating, by a hardware processor, an installation of a program;
monitoring, by an analytics engine, telemetry data associated with the installation of the program;
calculating a confidence index based upon the monitored telemetry data;
generating recommendations based upon the calculated confidence index;
receiving an end-user entered recommendation selection; and
controlling the installation of the program based upon the received end-user entered recommendation selection.

19. The method of claim 18, wherein the confidence index includes a metric indicating a duration time for a completion of the installation of the program.

20. The information handling system of claim 18, wherein different recommendations are generated for different calculated confidence indices.

* * * * *